UNITED STATES PATENT OFFICE.

CLARENCE ROSCOE KING, OF WORCESTER, MASSACHUSETTS, ASSIGNOR TO NORTON COMPANY, A CORPORATION OF MASSACHUSETTS.

ABRASIVE TOOL AND PROCESS OF MAKING THE SAME.

1,325,504. Specification of Letters Patent. Patented Dec. 16, 1919.

No Drawing. Application filed July 5, 1917. Serial No. 178,868.

*To all whom it may concern:*

Be it known that I, CLARENCE ROSCOE KING, a citizen of the United States of America, residing at Worcester, in the county of Worcester and State of Massachusetts, have invented certain new and useful Improvements in Abrasive Tools and Processes of Making the Same, of which the following is a full, clear, and exact specification.

My invention relates to abrasives and more particularly to grinding wheels having abrasive particles bonded together by a resinous medium. In an abrasive grinding wheel, one important quality is its hardness, this being a function of the nature, amount and method of treatment of the bonding material utilized to hold the abrasive particles together. Shellac, used in the so called "elastic" wheel, has been found to be an excellent bond and to afford a grinding tool of considerable utility, but it has heretofore been impossible to obtain a wheel bonded by shellac of sufficient hardness and other desirable characteristics to meet the demands of certain types of grinding operation.

It is an object of my invention to provide a grinding instrumentality having as a bonding agent for abrasive particles a dense, tenacious and substantially homogeneous cementitious magma containing the resinous material shellac, which, depending on the proportions of the ingredients used, may be several degrees harder than obtainable previously in this art with the resin alone, and to provide an agent capable of rendering the resinous bond harder, denser and more tenacious, serviceable and durable under certain grinding operations than is shellac when used alone, and which can be simply and easily incorporated with the abrasive material without elaborate methods of manipulation or chemical treatment being required to produce a grinding tool of great utility.

To this and other ends, as will appear from the disclosure herein, my invention consists in the combination of parts and the steps of a process described in the specification and set forth in the appended claims.

In the practice of my invention, I utilize the principle involved in the fact that plaster of Paris has the peculiar property of forming with shellac an apparently homogeneous, cement-like material having high adhesive qualities, and I have discovered that this substance is well adapted for the grinding art and gives unexpectedly beneficial characteristics to a grinding instrumentality if employed in accordance with my invention.

In accordance therewith, I form an abrasive instrumentality useful for such operations as grinding, polishing, etc., by binding together abrasive particles of aluminium oxid, silicon carbid or other suitable material with a bond comprising, first the resin, shellac—which may be softened under heat to permit incorporation of the hardening material and abrasive—and second, a material having the property, like plaster of Paris or calcium sulfate, of forming with the resin under the application of heat a solid, apparently homogeneous, cementitious magma capable of bonding abrasive particles into a medium of denser, harder, more durable and more uniform qualities than is obtainable by use of the resin alone. Upon mixing dry plaster of Paris and shellac with abrasive and heating to melt the shellac, the calcium sulfate becomes incorporated with the shellac, and further heating results in the formation of a substantially homogeneous, dense, strongly adhesive bond surrounding the abrasive. Whether a chemical or a physical union of the ingredients has taken place is immaterial so far as my invention is concerned, and it should be understood that the claims specifying these ingredients are intended to cover any chemical compound that may result from a reaction of these substances, as well as a physical mixture thereof.

As a specific example setting forth the nature of one embodiment of my invention, a grinding wheel may be formed of an abrasive, such as aluminium oxid or silicon carbid, suitably graded in size according to the requirements of the work to be ground, and thoroughly mixed with definite amounts of dry shellac and plaster of Paris powder.

To produce a wheel denser and harder than obtainable by using the maximum amount of shellac alone as the bond, I may utilize the ingredients in proportions varying from 3% to 20% by weight of plaster of Paris and 12% to 30% by weight of shellac, the remaining portion being the abrasive. By way of specific example, I make one type of wheel of 13% by weight of shellac, 8% by weight of plaster of Paris and 79% by weight of abrasive. If a bond is formed of these ingredients in proportions outside of the limits above specified, softer grades of wheel are produced, the relative amounts of shellac and plaster of Paris employed and the heat treatment to which they are subjected determining the grinding characteristics of the wheel. I find it undesirable to depart from the limits herein set forth, as otherwise the wheel produced is either inferior in structure or no harder than wheels made without the use of plaster of Paris.

The ingredients, properly selected and measured, may be intimately mixed in a dry state and then packed in a mold of the desired shape. After heating the mixture to a temperature suitable for melting the shellac and forming the cement to bond the abrasive particles together, the mass may be subjected to pressure to give it greater compactness and density. The wheel may then be baked at a temperature of 300° to 350° F. for several hours, thereby aging, setting or otherwise rendering the bond more suitable for grinding or other abrasive purposes. In this way a bond is provided for binding the abrasive particles in the desired wheel shape, which has the quality of remaining non-plastic at normal grinding temperature or of becoming soft only on the grinding surface. Furthermore, the bond will gradually break down under the strains and impacts of the grinding operation to permit fresh cutting surfaces to be presented to the work, the rate of disintegration depending largely upon the proportions of ingredients employed in the make-up of the wheel and the particular use to which the wheel is put.

It is found by microscopic examination that if shellac is used alone as a bond made in accordance with this process, the finished product has a noticeably honeycombed appearance, as if the abrasive grains were coated with shellac and these coatings stuck together at points of contact, thus leaving numerous channels between the particles; whereas in my new bond the abrasive grains appear to be embedded in a solid field of cement. This homogeneous appearance of the mixture indicates that the bond has an intimate contact with all the surfaces of the grains and that it itself is substantially a solid mass without large structure-weakening pores or passages. By heat treating the wheel at a temperature of 300° F. to 350° F., I heat set the shellac and plaster of Paris into a hard, dense, tenacious, substantially homogeneous, cementitious magma, which bonds the abrasive particles together, this heat setting resulting in the formation of the cement-like magma. Furthermore, if the limits specified herein for the proportions of ingredients are not observed, a wheel structure is obtained which is porous, soft or unsuitable for types of grinding which require a hard bonded wheel.

Having thus described my invention, what I claim as new and desire to secure by Letters Patent is:

1. An abrading tool comprising abrasive particles and a bond embedding the particles, said bond consisting of 3% to 20% by weight of plaster of Paris and 12% to 30% by weight of shellac, the remaining percentage referring to the abrasive.

2. An abrading tool of a high degree of hardness comprising abrasive particles contacting with a dense, tenacious, substantially homogeneous, highly adherent, heat-set magma of 12% to 30% by weight of shellac and 3% to 20% by weight of plaster of Paris.

3. The process of making an abrading tool comprising making a formed body of abrasive particles combined with shellac and plaster of Paris and heat-setting the latter ingredients into a hard magma bonding the abrasive particles together.

4. The process of making an abrading tool comprising mixing abrasive particles with 12% to 30% by weight of shellac and 3% to 20% by weight of plaster of Paris, molding a tool body therefrom and then heat-treating the shellac and plaster of Paris within the body to set them as a dense, hard, cementitious magma binding the abrasive particles together.

Signed at Worcester, Massachusetts, this 2nd day of July, 1917.

CLARENCE ROSCOE KING.

Witnesses:
N. O. HAYWARD,
CLAYTON L. JENKS.